US010663986B2

(12) United States Patent
Imboccioli

(10) Patent No.: US 10,663,986 B2
(45) Date of Patent: May 26, 2020

(54) SYSTEM FOR ADJUSTING THE PRESSURE OF A GAS

(71) Applicant: Pietro Fiorentini SPA, Arcugnano (VI) (IT)

(72) Inventor: Claudio Imboccioli, Creazzo (IT)

(73) Assignee: Pietro Fiorentini SPA, Arcugnano (VI) (IT)

( * ) Notice: Subject to any disclaimer, the term of this patent is extended or adjusted under 35 U.S.C. 154(b) by 291 days.

(21) Appl. No.: 15/546,527

(22) PCT Filed: Feb. 17, 2016

(86) PCT No.: PCT/IB2016/050843
§ 371 (c)(1),
(2) Date: Jul. 26, 2017

(87) PCT Pub. No.: WO2016/132300
PCT Pub. Date: Aug. 25, 2016

(65) Prior Publication Data
US 2018/0275694 A1 Sep. 27, 2018

(30) Foreign Application Priority Data

Feb. 17, 2015 (IT) ................................ VI2015A0046

(51) Int. Cl.
*G05D 16/04* (2006.01)
*G05D 16/16* (2006.01)
(Continued)

(52) U.S. Cl.
CPC ....... *G05D 16/0402* (2019.01); *G05D 16/163* (2013.01); *F16K 31/1268* (2013.01);
(Continued)

(58) Field of Classification Search
CPC .......... G05D 16/0619; G05D 16/0402; G05D 16/028; G05D 16/0672; G05D 16/0636;
(Continued)

(56) References Cited

U.S. PATENT DOCUMENTS

| 6,173,735 B1 * | 1/2001 | Perry, Jr. ............. G05D 16/163 137/489 |
| 2003/0098071 A1 * | 5/2003 | Cecchinato .......... G05D 16/163 137/488 |

FOREIGN PATENT DOCUMENTS

| EP | 0 683 444 A1 | 5/1995 |
| EP | 0 919 897 A2 | 11/1998 |

(Continued)

OTHER PUBLICATIONS

International Search Report and Written Opinion dated Jun. 15, 2016, issued in PCT Application No. PCT/162016/050843, filed Feb. 17, 2016.

*Primary Examiner* — Hailey K. Do
(74) *Attorney, Agent, or Firm* — Workman Nydegger

(57) ABSTRACT

A system for adjusting pressure of a gas includes: a first shutter unit for causing a pressure drop in the gas, from a supply pressure to a delivery pressure; a pilot unit for providing a pilot pressure depending on the difference between the delivery pressure and a predefined setting pressure; a first drive unit operated by the pilot pressure to reduce the opening of the first shutter unit when the delivery pressure exceeds the setting pressure, and vice versa; a second shutter unit in series with the first shutter unit can assume a closed configuration; a second drive unit operated by the pilot pressure to reduce the opening of the second shutter unit when the delivery pressure exceeds the setting pressure, and vice versa. When the first shutter unit is open the opening of the second shutter unit causes a pressure drop smaller than the pressure drop by the first shutter unit.

10 Claims, 2 Drawing Sheets

(51) Int. Cl.
*F16K 31/126* (2006.01)
*F16K 31/385* (2006.01)
*G05D 16/06* (2006.01)

(52) U.S. Cl.
CPC ...... *F16K 31/3855* (2013.01); *G05D 16/0619* (2013.01); *Y10T 137/7768* (2015.04); *Y10T 137/7769* (2015.04); *Y10T 137/7787* (2015.04); *Y10T 137/88062* (2015.04)

(58) Field of Classification Search
CPC ........... G05D 16/0655; G05D 16/0661; G05D 16/08; G05D 16/163; F16K 31/1268; F16K 31/365; F16K 31/385; F16K 31/3855; F16K 31/1225; F16K 31/383; F16K 31/3835; F16K 1/443; Y10T 137/7764; Y10T 137/7768; Y10T 137/7769; Y10T 137/777; Y10T 137/7787; Y10T 137/88062
See application file for complete search history.

(56) References Cited

FOREIGN PATENT DOCUMENTS

| EP | 2119947 A2 * | 11/2009 | ............. F16K 1/443 |
|---|---|---|---|
| WO | 00/66920 | 11/2000 | |

* cited by examiner

SYSTEM FOR ADJUSTING THE PRESSURE OF A GAS

BACKGROUND OF THE INVENTION

1. The Field of the Invention

The present invention concerns a system for adjusting the pressure of a gas, particularly suited to adjust the gas pressure in a natural gas distribution network.

2. The Relevant Technology

As is known, in natural gas distribution networks pressure regulators are used which are suited to reduce the gas pressure from a gas supply pressure that is present upstream of the regulator to a delivery pressure that is present downstream of the regulator. In particular, the regulator maintains the delivery pressure at a predefined setting value, independently of the gas flow rate and of the value of the gas supply pressure.

A pressure regulator of the type mentioned above comprises a movable shutter that produces a variable pressure drop in the gas flow duct.

The opening of the shutter is controlled by a pilot valve that makes it possible to adjust the delivery pressure with high precision and furthermore allows the regulator to be set.

When the gas delivery pressure is different from the set value, the pilot valve controls the shutter in such a way as to vary its degree of opening, until restoring the set pressure value.

When the gas flow rate is equal to zero due to an interruption in demand by the users, the pilot valve controls the shutter in such a way as to close it.

Due to the delay between the interruption of the gas flow and the closure of the shutter, the gas pressure downstream of the shutter reaches a maximum value that is slightly higher than the setting value, which is taken in consideration when determining the size of the system.

The system described above poses the drawback that the sealing members in the area of the shutter may be subject to progressive erosion due to the reduced cross section in that area, which results in a high gas speed around said sealing members.

Said erosion is favoured by the thermal shocks exerted on the sealing members, due to the change in temperature caused by the gas pressure drop between the two sides of the shutter as a consequence of the known Joule-Thompson effect.

Furthermore, the reduced cross section and the decreased gas temperature downstream of the shutter favour the accumulation of impurities and the solidification of any components of the gas at the level of the sealing members.

The drawbacks mentioned above affect the ability of the sealing members to close the duct when the flow rate is equal to zero, thus leading to an increase in the maximum pressure reached by the gas downstream of the shutter.

In order to avoid the above mentioned drawback, the regulator needs to be frequently checked, or it is necessary to adopt countermeasures such as, for example, the use of safety devices, and/or to oversize the components downstream of the regulator, with a consequent increase in installation and operating costs.

Document EP0683444 A1 discloses a gas-pressure regulator comprising a single body to which the following are mechanically connected: the control head of a main regulator, the control head of a safety regulator, a pair of devices each of them being suited to activate one of said heads and a unit activating a cut-off valve. Said heads and said activating unit co-operate with adjusting and/or intercepting mechanisms belonging to said regulators and to said cut-off valve which are separate from and co-axial with one another and which are co-axially connected with a single annular opening which belongs to said single body.

SUMMARY OF THE INVENTION

It is the object of the present invention to overcome the above mentioned drawbacks that are typical of the pressure adjusting systems of the known type.

In particular, it is the object of the present invention to provide a gas pressure adjusting system that ensures a constant duct closing pressure for a longer time compared to the adjusting systems of the known type.

Said objects are achieved by a pressure adjusting system carried out according to the main claim.

Further characteristics and details of the invention are illustrated in the respective dependent claims.

Advantageously, maintaining the maximum closing pressure downstream of the shutter for a longer time reduces the need for checks on the regulator and avoids the need to provide safety devices and to oversize the components of the system.

BRIEF DESCRIPTION OF THE DRAWINGS

The objects and the advantage mentioned above, together with others that will be described here below, are highlighted in the description of a preferred embodiment of the invention, which is provided by way of non-limiting example with reference to the attached drawings, wherein.

DETAILED DESCRIPTION OF THE PREFERRED EMBODIMENTS

The pressure adjusting system according to the invention is particularly suited to adjust the pressure of natural gas in a distribution network, in such a way as to maintain it at a predefined setting value.

It is evident, furthermore, that the invention can be used to adjust the pressure of any gas in distribution networks of any type.

Figure 1:
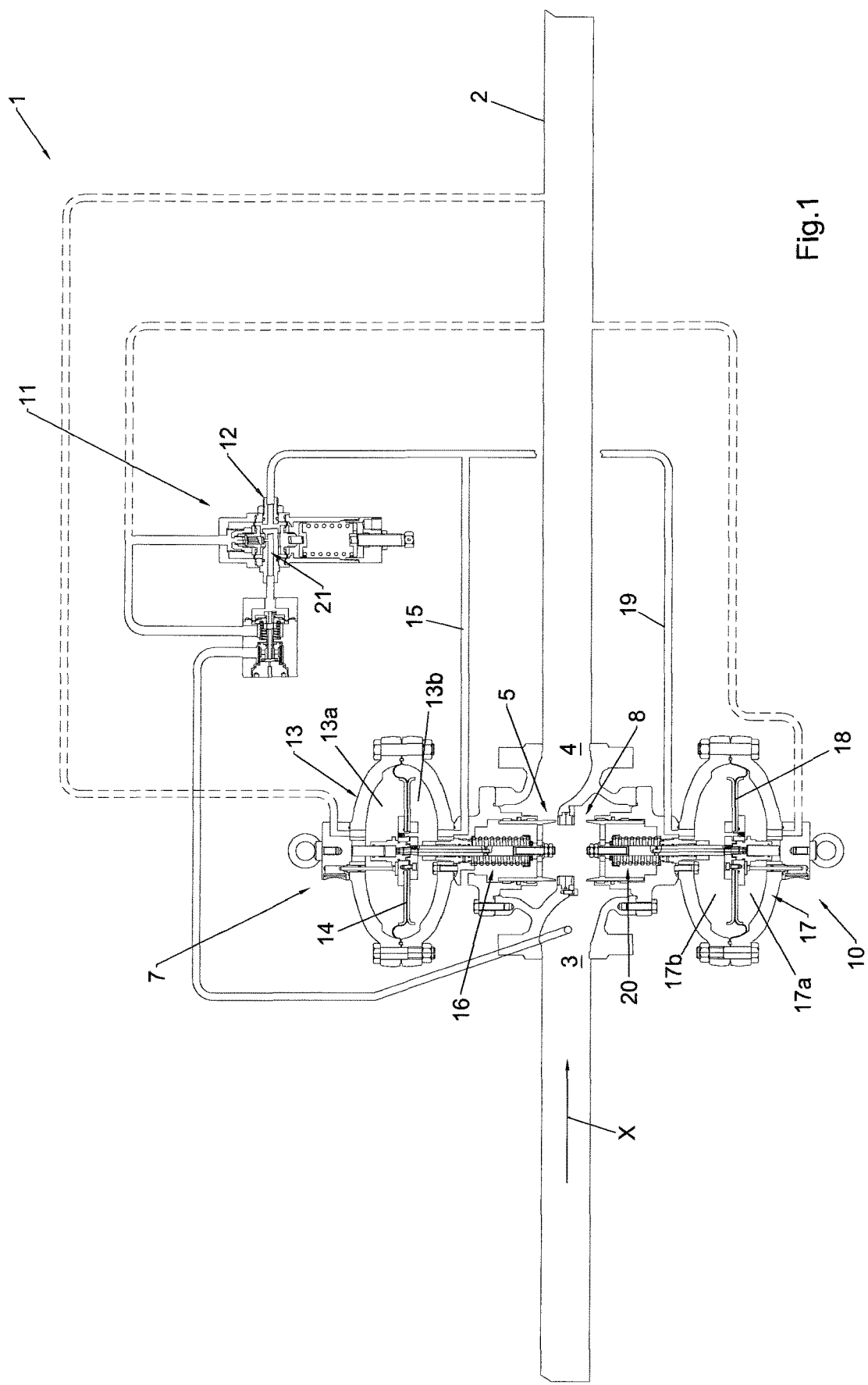
FIG. 1 shows a schematic sectional view of the adjusting system that is the subject of the invention.

Said pressure adjusting system, indicated as a whole by 1 in FIG. 1, comprises a flow duct 2 in which the gas flows according to a flow direction X.

Figure 2:
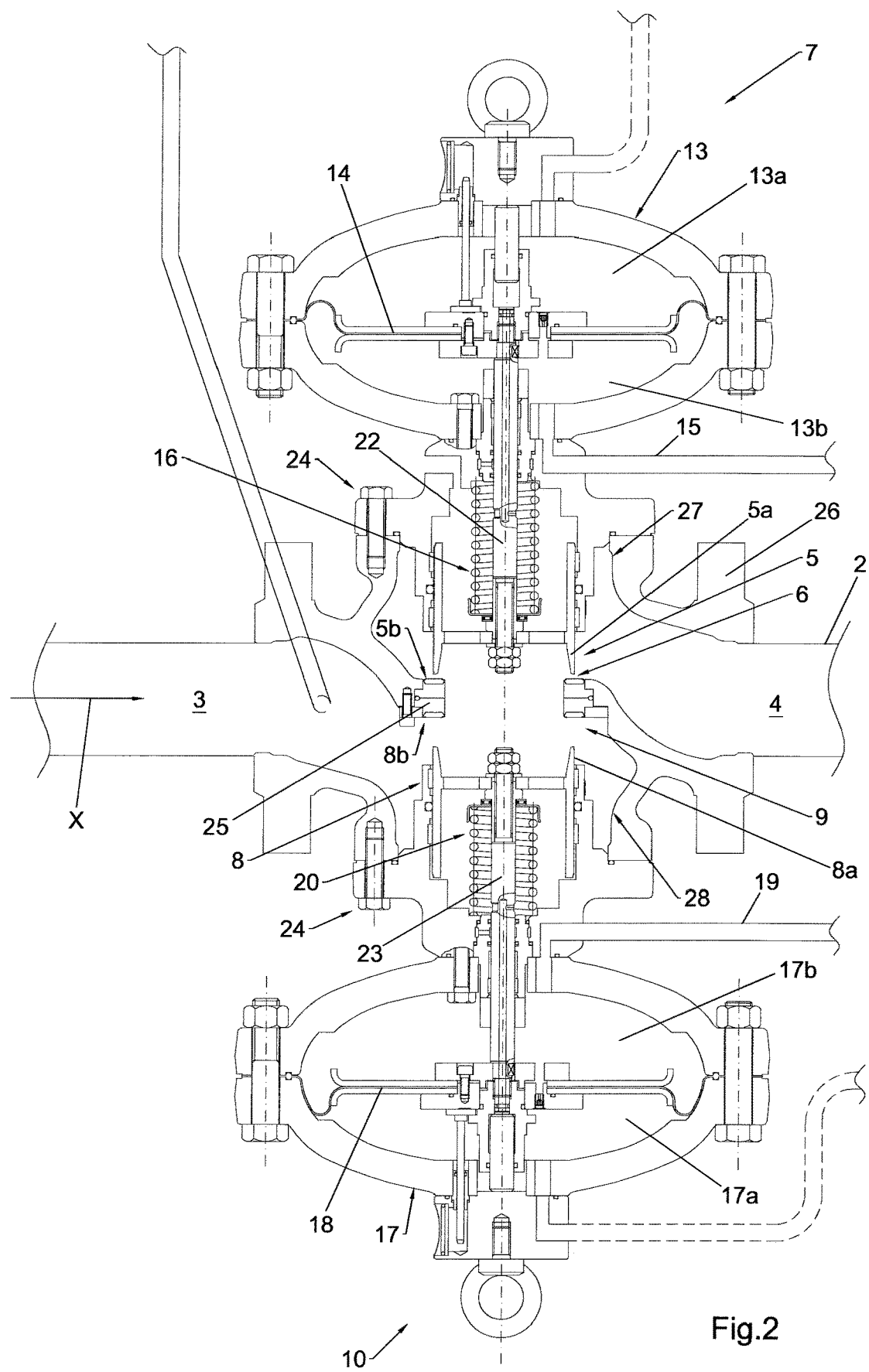
FIG. 2 shows a detail of the adjusting system illustrated in FIG. 1.

As shown in greater detail in FIG. 2, the adjusting system 1 comprises first shutter means 5 arranged in the flow duct 2 in such a way as to define a first bottleneck 6.

Said first bottleneck 6 causes a gas pressure drop, between a gas supply pressure present in a first area 3 of the flow duct 2 arranged upstream of the first shutter means 5 with respect to the flow direction X and a gas delivery pressure present in a second area 4 arranged downstream of said first shutter means.

The adjusting system 1 furthermore comprises pilot means 11 providing a pilot pressure that depends on the difference between the delivery pressure and a predefined and adjustable setting pressure.

The first shutter means 5 are moved by first drive means 7 in such a way as to vary their degree of opening, that is, the cross section of the first bottleneck 6.

In particular, the first drive means 7 are operated by the pilot pressure in such a way that when the delivery pressure exceeds the setting pressure they reduce the degree of opening of the first shutter means 5 so as to increase the gas pressure drop.

The opposite takes place, instead, when the delivery pressure is lower than the setting pressure.

The operating mode just described above makes it possible to maintain the gas delivery pressure at a value that is equal to the predefined setting value, except for negligible deviations.

According to the invention, the adjusting system 1 comprises also second shutter means 8 arranged in the flow duct 2 in series to the first shutter means 5.

The second shutter means 8 define a second bottleneck 9 in the flow duct 2 and are suited to assume a closed configuration in which they tightly close the flow duct 2, in such a way as to prevent the flow of gas.

The second shutter means 8 are controlled by corresponding second drive means 10 in a manner that is analogous to that described for the first shutter means 5.

More precisely, when the delivery pressure exceeds the setting pressure defined by the pilot means 11, the second drive means 10 reduce the degree of opening of the second shutter means 8, that is, the cross section of the second bottleneck 9, and vice versa.

In particular, when the gas flow rate is equal to zero, both of the shutter means 5 and 8 are closed, as both the respective drive means 7 and 10 controlling them are operated by the same pilot means 11.

The drive means 7 and 10, furthermore, are configured to control the shutter means 5, 8 in such a way that when the first shutter means 5 are open the degree of opening of the second shutter means 8 is such as to cause a gas pressure drop that is negligible or in any case smaller than that produced by the first drive means 5.

Said condition corresponds to the normal operating condition of the adjusting system 1, in which there is a gas flow in the flow duct 2 and the adjusting system 1 adjusts the delivery pressure in such a way as to maintain it at the same value as that of the setting pressure.

Due to the different pressure drop across the shutter means 5, 8, the gas flows through the second shutter means 8 at a speed that is lower than that at which it flows through the first shutter means 5.

Consequently, the deterioration and deposit phenomena described above affect the second shutter means 8 to a lesser extent than the first shutter means 5.

Therefore, even when the first shutter means 5 are deteriorated to the point that they are no more able to close the flow duct 2 when there is no gas flow, said closure is in any case ensured by the second shutter means 8.

As the second shutter means 8 deteriorate more slowly than the first shutter means 5, they can ensure the closure of the flow duct at a pressure value that remains constant for a longer time, thus achieving the object of the invention.

It can thus be understood that in the adjusting system 1 described above the gas pressure is adjusted mainly through the first shutter means 5, given that the gas pressure drop takes place mainly through the latter, while the second shutter means 8 serve the main function of ensuring the closure of the flow duct 2.

For this reason, it is not necessary for the first shutter means 5 to be configured in such a way as to tightly close the flow duct 2, as in any case the sealing effect is ensured by the second shutter means 8.

Preferably, the difference between the pressure drops generated by the shutter means 5 and 8 in the normal adjusting field, meaning when the first shutter means 5 are open, is obtained by maintaining different degrees of opening between the two shutter means 5 and 8.

In other words, the drive means 7, 10 are preferably configured so as to control the shutter means 5, 8 in such a way that the ratio between the cross section of the second bottleneck 9 and the cross section of the first bottleneck 6 exceeds 1.

Preferably, said ratio is at least equal to 1.5, in such a way as to ensure that the pressure drop across the second shutter means 8 is considerably smaller than the pressure drop across the first shutter means 5.

If the criterium just described above is adopted, the shutter means 5 and 8 preferably have the same geometric structure, so that the same degrees of opening correspond to the same pressure drops, assuming that the gas conditions upstream are the same.

Preferably, the first drive means 7 comprise a first movable wall 14 mechanically connected to the first shutter means 5 and arranged in a first motorization chamber 13.

The first movable wall 14 subdivides the first motorization chamber 13 into a reference area 13a communicating with the second area 4 of the flow duct 2 and a pilot area 13b under pilot pressure communicating, through a first pilot duct 15, with an outlet mouth 12 belonging to the pilot means 11.

The first drive means 7 comprise also first counteracting means 16 configured so as to exert on the first shutter means 5 a force that is contrary to the force exerted by the pilot pressure on the first movable wall 14.

In this way, depending on whether the difference between the pilot pressure and the delivery pressure present in the second area 4 of the duct 2 is lower or higher than the force of the first counteracting means 16, the first shutter means 5 are moved in either one or the other direction.

Analogously, the second drive means 10 comprise a second movable wall 18 mechanically connected to the second shutter means 8 and arranged in a second motorization chamber 17 in such a way as to subdivide it into a reference area 17a communicating with the second area 4 of the flow duct 2 and a pilot area 17b communicating with the outlet mouth 12 of the pilot means 11 through a second pilot duct 19.

The second drive means 10 comprise also second counteracting means 20 configured so as to exert on the second shutter means 8 a force that is contrary to the force exerted by the pilot pressure on the second movable wall 18.

Preferably, the counteracting means 16 and 20 are configured in such a way as to exert corresponding forces intended to close the respective shutter means 5 and 8, so as to counteract the action of the pilot pressure that, instead, acts in the motorization chambers 13 and 17 in such a way as to generate corresponding forces intended to open the shutter means 5 and 8.

Advantageously, said configuration ensures that the shutter means 5 and 8 close if the pilot pressure lowers to zero in case of failure of the pilot means 11.

Preferably, each of the counteracting means 16 and 20 comprise corresponding elastic means such as, for example, a spring.

As regards the differentiated opening of the shutter means 5 and 8 as described above, this can be obtained by configuring the first counteracting means 16 in such a way that the force they exert when the first shutter means 5 are closed is greater than the force exerted by the second counteracting means 20 when the second shutter means 8 are closed.

This ensures that the second shutter means 8 are opened before the first shutter means 5.

In the case where the counteracting means 16, 20 comprise elastic means, the condition described above can be obtained by preloading said elastic means in a different manner, or assigning them different elastic constants.

As an alternative to or in combination with the technique just described above, said condition of differentiated opening of the shutter means 5 and 8 can be obtained by arranging lamination means suited to produce a localized pressure drop along the first pilot duct 15 that connects the pilot means 11 with the first motorization chamber 13.

In this way, the pressure acting in the pilot area 13*b* of the first motorization chamber 13 is lower than the pressure acting in the pilot area 17*b* of the second motorization chamber 17, under the same pilot pressure, producing the same effect obtainable through the counteracting means 16 and 20 with different forces, as described above.

Said lamination means, not illustrated in the figures, may comprise a valve, a bottleneck or any known means suited to generate a pressure drop in the gas flowing in the first pilot duct 15.

The two techniques just described above make it possible to slow down and/or delay the closing of the second shutter means 8 with respect to the first shutter means 5 when the delivery pressure increases and, vice versa, to accelerate and/or advance the opening of the second shutter means 8 with respect to the first shutter means 5 when the delivery pressure decreases.

As regards the shutter means 5 and 8, they preferably comprise respective shutters 5*a* and 8*a* cooperating with two corresponding reference surfaces 5*b* and 8*b* belonging to the flow duct 2.

Preferably, the shutters 5*a* and 8*a* are coaxial and the respective reference surfaces 5*b* and 8*b* belong to corresponding opposite sides of the same annular sealing member 25.

Advantageously, the configuration just described above makes it possible to obtain an adjusting system 1 that is particularly compact and easy to install.

The adjusting system 1 preferably comprises a main body 26 that defines the flow duct 2 and that preferably comprises two flanges for connecting the two ends of the flow duct 2 to corresponding branches of the distribution network.

The main body 26 comprises also the annular sealing member 25 and two holes 27, 28 that are located opposite each other with respect to the latter, in which the shutters 5*a* and 8*a* are respectively arranged in a sliding manner.

Each shutter 5*a*, 8*a* is connected to the corresponding movable wall 14, 18 through a shaft 22, 23 arranged in the corresponding one of said two holes 27, 28.

Each motorization chamber 13, 17 is preferably connected to the end of a corresponding one of said two holes 27, 28 through removable connection means 24 that preferably but not necessarily comprise screws.

The pilot means 11 preferably comprise valve means 21 that connect the outlet mouth 12 with the first area 3 of the flow duct 2 under the supply pressure.

The valve means 21 are operated by the delivery pressure, in such a way that they close when the latter exceeds the setting pressure.

The above is preferably obtained by means of a membrane that activates the valve means 21 and is subjected to the delivery pressure and to a force that is opposite to the delivery pressure, obtained through counteracting means that, for example, may comprise a spring.

Furthermore, the reference area 13*a* and the pilot area 13*b* of the first motorization chamber 13 are placed in communication with each other through a precisely sized hole.

Analogously, the reference area 17*a* and the pilot area 17*b* of the second motorization chamber 17 are placed in communication with each other through a precisely sized hole.

Furthermore, the reference areas 13*a* and 17*a* communicate with the second area 4 of the flow duct 2.

The operating mode of the pressure adjusting system 1 is described here below by way of non-limiting example, with reference to the figures. Clearly, in principle a pressure adjusting system carried out according to a different embodiment of the invention will operate in an analogous manner, even if with obvious adaptations.

When the gas flow rate required by the user is reduced, the gas delivery pressure increases and the valve means 21 of the pilot means 11 tend to close.

This reduces the pilot pressure in such a way as to reduce the gas flow rate that flows from the first area 3 of the duct 2 through the pilot ducts 15 and 19 towards the motorization chambers 13, 17 and, from there, towards the second area 4 of the duct 2.

Consequently, the difference in pressure between each pilot area 13*b*, 17*b* and the respective reference area 13*a*, 17*a* of the motorization chambers 13, 17 tends to decrease due to the respective precisely sized holes, thus reducing the pressure force exerted on the movable walls 14, 18.

Therefore, the first counteracting means 16 and the second counteracting means 20 push the shutters 5*a* and 8*a* in the direction corresponding to the closure of the respective bottlenecks 6 and 9, thus increasing the gas pressure drop by means of the shutters, in particular by means of the first shutter 5*a*, in order to reduce the delivery pressure so that it approximates the setting value.

When the flow rate required by the users is equal to zero, said pushing action exerted on the shutters 5*a* and 8*a* is prolonged until they are completely closed.

In this case, the second shutter 8*a* ensures the tight closure of the flow duct 2, thus preventing a further increase in the delivery pressure, independently of the possible deterioration of the sealing ability of the first shutter 5*a*.

Clearly, the contrary occurs when the gas flow rate required by the users increases.

In particular, the valve means 21 open, thus generating a gas flow through the pilot ducts 15 and 19.

Consequently, the movable shutters 14, 18 are subjected to pressure forces that exceed the forces of the counteracting means 16, 20, thus increasing the degree of opening of both the shutters 5*a*, 8*a* so as to reduce the gas pressure drop.

If the first pilot duct 15 comprises lamination means, the pressure in the pilot area 17*b* of the second motorization chamber 17 exceeds the pressure present in the pilot area 13*b* of the first motorization chamber 13.

Consequently, the second shutter 8*a* opens more quickly than the first shutter 5*a*, maintaining a higher degree of opening.

A completely analogous effect is obtained even if the second counteracting means 20 are configured to produce a smaller force than the first counteracting means 16.

The higher degree of opening of the second shutter 8*a* makes it possible to reduce the gas speed through the latter, thus preventing its sealing ability from deteriorating due to wear and thermal shocks.

According to the above, it can be understood that the pressure adjusting system described above achieves the set objects.

In particular, the presence of two shutter means controlled by the same pilot means in such a way as to cause different pressure drops makes it possible to avoid the deterioration of one of the two shutter means, prolonging their sealing ability.

The invention claimed is:

1. A system for adjusting a pressure of a gas, comprising:
   a flow duct for said gas;
   first shutter means arranged in said flow duct for causing a pressure drop from a supply pressure present in a first area of said flow duct, upstream of said first shutter means with respect to a flow direction of said gas, to a delivery pressure present in a second area of said flow duct, downstream of said first shutter means;
   pilot means for providing a pilot pressure depending on a difference between said delivery pressure and a predefined setting pressure;
   first drive means operated by said pilot pressure for varying a degree of opening of said first shutter means in such a way that, when said delivery pressure exceeds said predetermined setting pressure, the degree of opening of said first shutter means is reduced, and vice versa;
   second shutter means arranged in said flow duct in series to said first shutter means, said second shutter means assuming a closed configuration in which said second shutter means tightly close said flow duct;
   second drive means operated by said pilot pressure for varying a degree of opening of said second shutter means in such a way that, when said delivery pressure exceeds said predetermined setting pressure, the degree of opening of said second shutter means is reduced, and vice versa;
   said first drive means and said second drive means being configured so as to control said first shutter means and said second shutter means in such a way that, when said first shutter means are open, said second shutter means produce in said gas a second pressure drop that is smaller than a first pressure drop produced by said first shutter means;
   wherein said first drive means and said second drive means are configured in such a way as to control said first shutter means and said second shutter means so that when said first shutter means are open, said second shutter means define a second flow area that exceeds a first flow area defined by said first shutter means.

2. The system according to claim 1, wherein when said first shutter means are open, the second flow area defined by said second shutter means is at least 1.5 times bigger than the first flow area defined by said first shutter means.

3. The system according to claim 1, wherein the first drive means comprises:
   a first movable wall mechanically connected to said first shutter means and arranged in a first motorization chamber so as to subdivide said first motorization chamber into a first reference area communicating with said second area of said flow duct and into a first pilot area communicating, through a first pilot duct, with an outlet mouth belonging to said pilot means, said pilot pressure being present in said pilot means;
   first counteracting means for exerting on said first shutter means a force that is contrary to a force exerted on said first movable wall by said pilot pressure;
   and wherein said second drive means comprise:
   a second movable wall mechanically connected to said second shutter means and arranged in a second motorization chamber in such a way as to subdivide said second motorization chamber into a second reference area communicating with said second area of said flow duct and in a second pilot area communicating with said outlet mouth through a second pilot duct;
   second counteracting means for exerting on said second shutter means a force that is contrary to a force exerted on said second movable wall by said pilot pressure.

4. The system according to claim 3, wherein said first counteracting means and said second counteracting means are configured so as to exert corresponding forces intended to respectively close said first shutter means and said second shutter means.

5. The system according to claim 4, wherein said first counteracting means and said second counteracting means are configured in such a way that the force exerted by said first counteracting means when said first shutter means are arranged in a closed configuration exceeds the force exerted by said second counteracting means when said second shutter means are arranged in the closed configuration.

6. The system according to claim 3, wherein:
   said pilot means comprise valve means for connecting said outlet mouth with said first area of said flow duct and are operated by said delivery pressure in such a way that said valve means close when said delivery pressure is higher than said predetermined setting pressure;
   said reference area and said pilot area of said first motorization chamber are placed in communication through a first hole and said reference area communicates with said second area of said flow duct;
   said reference area and said pilot area of said second motorization chamber are placed in communication through a second hole and said reference area communicates with said second area of said flow duct.

7. The system according to claim 3, wherein:
   said first shutter means comprise a first shutter cooperating with a first reference surface belonging to said flow duct;
   said second shutter means comprise a second shutter cooperating with a second reference surface belonging to said flow duct.

8. The system according to claim 7, wherein said first shutter and second shutter are coaxial and wherein said first reference surface and said second reference surface belong to corresponding opposite sides of an annular sealing member interposed between said first shutter means and said second shutter means.

9. The system according to claim 8, further comprising a main body that defines said flow duct and said annular sealing member, and said main body comprises two holes which are opposite each other with respect to said annular sealing member, said first shutter and said second shutter being respectively arranged inside said two holes in a sliding manner, each one of said first shutter and said second shutter being connected to a respective one of the first movable wall and the second movable wall via a shaft, each respective shaft arranged, respectively, in a corresponding hole.

10. The system according to claim 9, wherein each one of said first motorization chamber and second motorization chamber is connected to an end of a respective one of said two holes through removable connection means.

* * * * *